United States Patent [19]
Malis et al.

[11] 3,746,495

[45] July 17, 1973

[54] ANTI-ULCER THERAPY

[75] Inventors: Jerry L. Malis, Blue Bell; Marvin E. Rosenthale, Havertown, both of Pa.

[73] Assignee: American Home Products Corporation, New York, N.Y.

[22] Filed: June 1, 1971

[21] Appl. No.: 149,063

[52] U.S. Cl.................... 429/319, 424/304, 424/305
[51] Int. Cl............................................. A61k 27/00
[58] Field of Search..................... 424/304, 305, 319

[56] References Cited
UNITED STATES PATENTS

| | | | |
|---|---|---|---|
| 3,419,655 | 12/1968 | Alburn et al........................ | 424/319 |
| 3,564,048 | 2/1971 | Fletcher et al..................... | 424/319 |
| 3,565,943 | 2/1971 | Juby et al. .......................... | 424/319 |

OTHER PUBLICATIONS

Biochemical Pharmacology, Vol. 5, (1960), pp. 108–129.

Primary Examiner—Albert T. Meyers
Assistant Examiner—Frederick E. Waddell
Attorney—Vito Victor Bellino, Andrew Kafko, Joseph Martin Weigman and D. E. Frankhouser

[57] ABSTRACT

A process as disclosed for treating ulcers in warm-blooded animals by administering a compound selected from a group of cycloleucyl compounds, such as, 1-aminocyclopentanecarboxylic acid, 1-methylaminocyclopentane-carboxylic acid, and 1-aminocyclopentanecarboxylic acid, ethyl ester.

1 Claim, No Drawings

ANTI-ULCER THERAPY

SUMMARY OF THE INVENTION

This invention relates generally to a method of treating ulcers in warm-blooded animals. More particularly, the invention relates to a method which utilizes the administration to warm-blooded animals of a compound selected from a group of compounds defined below, which compounds have been found to have unexpected anti-ulcer activity.

DESCRIPTION OF THE INVENTION

We have now discovered that a particular group of compounds, previously known only to be useful primarily as chemical intermediates, surprisingly are highly effective anti-ulcer agents. The invention, in its broadest concept, resides in the method of treating an ulceration in a warm-blooded animal by administering to the animal a therapeutically active amount of a compound selected from the group consisting of those having the following general formulae:

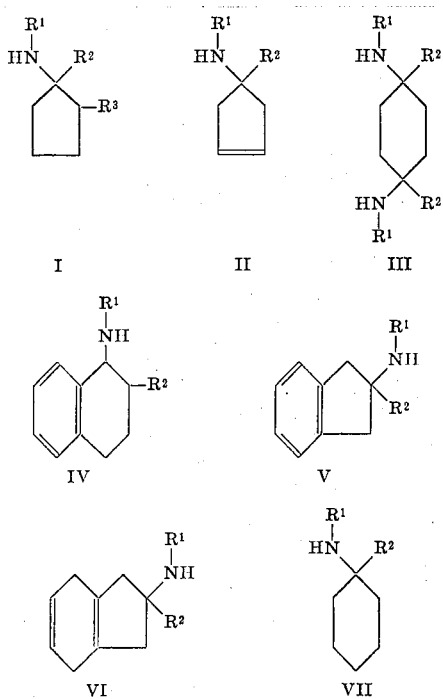

wherein $R^1$ is hydrogen, amino or lower alkyl having one to five carbons in a straight or branched chain,
$R^2$ is carboxyl, nitrile or phenylcarboxyl, and
$R_3$ is hydrogen or hydroxyl.

Specific compounds falling within Formula I as defined above and, hence, useful in the method of invention are, for example, 1-aminocyclopentanecarboxylic acid, 1-methylaminocyclopentanecarboxylic acid, and 1-amino-cyclopentanecarboxylic acid, ethyl ester. The first compound may also be used in the form of its polymers having a repeating molecular unit, which may be present in a frequency as high as 100, for example; wherea the last compound may also be used in the form of its acid-addition salts, e.g., as the HCl salt thereof.

The acid forms of the compound falling within Formula I above, wherein $R^2$ is carboxyl may generally be prepared by known procedures. For example, the corresponding hydantoin of the unsubstituted amino acid (that is, where $R^1$ is hydrogen and $R^2$ is carboxyl,) may first be synthesized by heating-reacting cyclopentanone with potassium cyanide in the presence of ammonium carbonate in an aqueous ethanol reaction medium until the ethanol and ammonium carbonate are removed. The cooled residual solution may then be broght to pH 3, for instance by addition of mineral acid, after precipitated hydantoin may be filtered off, washed and dried. The resulting hydantoin may then be refluxed under nitrogen with concentrated sulfuric acid. The resulting solution may then be cooled and neutralized to pH 5, for instance by addition of sodium hydroxide. The resulting product may then be purified by conventional means such as dissolving in warm water, treating with activated charcoal, raising the pH, and cooling to obtain a solid product which may then be dried.

The lower alkyl N-substituted amino acids where $R^1$ is lower alkyl and $R^2$ is carboxyl may be prepared by heating the corresponding N-alkylated-p-toluenesulfonamido acid with concentrated hydrochloric acid in a bomb, and then recovering the resultant lower-alkyl-substituted acid by well-known purification and isolation technique.

The lower alkyl esters of the compounds defined in Formula I (i.e.,wherein $R^1$ is either hydrogen or lower alkyl and $R^2$ is carboxyl or phenylcarboxyl) may be prepared from the corresponding acid, obtained in the manner previously described, by refluxing the acid in a mineral acid-saturated alcohol medium, and thereafter adding benzene, forming a ternary azeotrope which is then distilled. The lower alkyl ester or phenyl ester may then be evaporated to dryness, and the residue crystallized from ethanol and ether.

TEST METHOD

The compounds were tested according to a modification of the method described by D. A. Brodie and H. Hanson in *Gastroenterology*, 38, 352 (1960).

Groups of ten male Charles River rats 100 to 120 gms. are restrained in metal tubes and placed in a cold room (4°C.) for 90–180 minutes. Test compounds and vehicle controls are administered orally or parenterally immediately before placing the animals into the cold room. On removal, the animals were sacrificed and their stomachs are scored for severity of ulceration on a 0 to 4 scoring system. A protection score is calculated by subtracting the severity score of the drug treated group from the score of a control group which is run on the same day. Protection scores of +3 or greater indicate significant anti-ulcer activity.

Following the above procedure a number of compounds were tested at different dosages administered orally. The results obtained are shown in Table 1.

TABLE 1
ACTIVITY COMPARISONS IN RATE ANTI-ULCER TEST

| Compound | Dose | Protection Score |
|---|---|---|
| 1-aminocyclopentane carboxylic acid | 25 mg/kg | +5 |
| | 50 mg/kg | +3 |
| 1-aminocyclohexane carboxylic acid | 25 mg/kg | +3 |
| | 50 mg/kg | +5 |
| 1-amino-3-cyclopentene-1-carboxylic acid | 25 mg/kg | +4 |

| | | |
|---|---|---|
| 1-hydrazinocyclopentane carboxylic acid | 50 mg/kg | +7 |
| 1-aminocyclopentanecarbonitrile | 50 mg/kg | +5 |
| 2-amino-2-indancarboxylic acid | 25 mg/kg | +9 |
| 2-amino-4,7-dihydro-2-indancarboxylic acid | 50 mg/kg | +6 |
| 1-amino-1,2,3,4-tetrahydro-2-naphthalenecarboxylic acid, hydrochloride, hydrate | 50 mg/kg | +7 |
| 1,4-diamino-1,4-cyclohexanedicarbonitrile | 50 mg/kg | +12 |
| Atropine | 0.5 mg/kg | +5 |
| Probanthine | 10 mg/kg | +4 |
| Alumina gel | 1 ml/rat | +6 |
| | 2 ml/rat | +5 |

The compounds of this invention may be administered along or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, the treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.5 to about 100 mg/kg. (milligrams per kilogram of body weight) per day, although, as aforementioned, variations will occur. However, a dosage level that is in the range of from about 5 to about 75 mg/kg per day is most desirably employed in order to achieve effective results. The terms and expressions wyich have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The method of treating ulcers in a warm blooded animal suffering from ulcers which comprises orally or parenterally administering to said animal an effective amount of 1-aminocyclopentane carboxylic acid.

* * * * *